(12) United States Patent
Henel et al.

(10) Patent No.: US 10,940,836 B2
(45) Date of Patent: Mar. 9, 2021

(54) METHOD TO ADJUST AN ACTIVATING BRAKING PRESSURE THRESHOLD VALUE

(71) Applicant: Ford Global Technologies, LLC, Dearborn, MI (US)

(72) Inventors: Christoph Henel, Mettmann NRW (DE); Tom Ramakers, Reinbach NRW (DE); Tadeusz Bularz, Bochum (DE)

(73) Assignee: Ford Global Technologies, LLC, Dearborn, MI (US)

( * ) Notice: Subject to any disclaimer, the term of this patent is extended or adjusted under 35 U.S.C. 154(b) by 296 days.

(21) Appl. No.: 16/005,354

(22) Filed: Jun. 11, 2018

(65) Prior Publication Data
US 2018/0362002 A1 Dec. 20, 2018

(30) Foreign Application Priority Data

Jun. 16, 2017 (DE) ...................... 10 2017 210 100.8

(51) Int. Cl.
  *B60T 8/17* (2006.01)
  *B60T 8/172* (2006.01)
  *B60T 7/12* (2006.01)

(52) U.S. Cl.
  CPC ............... *B60T 8/17* (2013.01); *B60T 7/122* (2013.01); *B60T 8/172* (2013.01); *B60T 2201/06* (2013.01)

(58) Field of Classification Search
  CPC ........ B60T 8/17; B60T 7/122; B60T 2201/06; B60T 13/74; B60T 8/36; B60T 7/12
  See application file for complete search history.

(56) References Cited

U.S. PATENT DOCUMENTS

| | | | | |
|---|---|---|---|---|
| 6,913,326 B1 * | 7/2005 | Ohkubo | ................. | B60T 7/122 303/11 |
| 7,950,750 B2 * | 5/2011 | Kamikado | ............ | B60T 8/4872 303/191 |
| 2009/0309414 A1 * | 12/2009 | Braeuer | ................. | B60T 7/122 303/191 |

(Continued)

FOREIGN PATENT DOCUMENTS

| DE | 19643877 A1 | 5/1997 |
|---|---|---|
| DE | 10151846 A1 | 5/2002 |

(Continued)

*Primary Examiner* — Thomas Ingram
(74) *Attorney, Agent, or Firm* — Raymond Coppiellie; Brooks Kushman, P.C.

(57) ABSTRACT

A method is provided to adjust an activating braking pressure threshold value of an automatic vehicle brake holding system of a vehicle. If a braking pressure that is generated through actuation of a vehicle brake of the vehicle exceeds an activating braking pressure threshold value while the vehicle is at a standstill, a brake holding state of the vehicle brake holding system is activated and a procedure for ascertaining time is started. A vehicle movement is ascertained during an activated brake holding state within a monitoring procedure period of time since starting the procedure to ascertain time. If a movement occurs within the monitoring procedure period of time, a value of a number of ascertained movements is increased. If this value exceeds a movement threshold value, the activating braking pressure threshold value is increased and the value of the number of ascertained movements is reduced.

20 Claims, 2 Drawing Sheets

(56) References Cited

U.S. PATENT DOCUMENTS

| | | | | |
|---|---|---|---|---|
| 2013/0226425 A1* | 8/2013 | Oliveira | ............... | B60T 7/122 |
| | | | | 701/70 |
| 2014/0330497 A1* | 11/2014 | Beger | ................ | B60T 8/171 |
| | | | | 701/70 |
| 2016/0023660 A1* | 1/2016 | Yu | ..................... | F02D 11/02 |
| | | | | 477/188 |

FOREIGN PATENT DOCUMENTS

| | | | |
|---|---|---|---|
| DE | 10063063 | A1 | 6/2002 |
| DE | 102012208917 | A1 | 11/2013 |
| DE | 102013104601 | A1 | 11/2014 |
| KR | 20130066388 | A | 6/2013 |
| KR | 20130138008 | A | 12/2013 |
| KR | 20160087275 | A | 7/2016 |

\* cited by examiner

METHOD TO ADJUST AN ACTIVATING BRAKING PRESSURE THRESHOLD VALUE

CROSS-REFERENCE TO RELATED APPLICATIONS

This application claims foreign priority benefits under 35 U.S.C. § 119(a)-(d) to DE Application 10 2017 210 100.8 filed Jun. 16, 2017, which is hereby incorporated by reference in its entirety.

TECHNICAL FIELD

The present disclosure relates to a method and system to adjust an activating braking pressure threshold value of an automatic vehicle brake holding system of a vehicle.

BACKGROUND

A vehicle brake holding system, in other words an auto-hold-system or automatic vehicle hold (AVH) system, facilitates operation of a vehicle brake by a driver of a motor vehicle, in other words a service brake of the vehicle, if the vehicle comes to a standstill in that said system maintains a braking pressure that is applied by the driver operating a brake pedal while the vehicle is at a standstill with a result that the driver can stop actively actuating the brake pedal while the vehicle is at a standstill. This can be helpful on a slope or on an inclined road, but also on a planar road. If torque is actively built up again, by way of example in that the driver of a motor vehicle having manual transmission engages a clutch or actuates a gas pedal, in order to bring the vehicle into motion again, an active brake holding state is deactivated and the vehicle brake holding system releases the brake.

If the vehicle brake holding system is in operation, the brake holding state, in other words a state in which the vehicle brake holding system maintains the braking pressure independently is activated if an activating braking pressure threshold value is exceeded while the vehicle is at a standstill. The brake holding state is in other words only activated if the driver actuates the brake pedal with sufficient force that the activating braking pressure threshold value is exceeded.

The braking pressure that is maintained by the vehicle brake holding system must be sufficiently high so as to also effectively maintain the vehicle at a standstill over a required period of time, even if, by way of example owing to limitations or inadequacies of the vehicle brake system, by way of example leaking or overheating valves, a braking effect diminishes over time.

However, the activating braking pressure threshold value is namely selected as sufficiently high that, even in a case of a diminishing braking effect, the vehicle is guaranteed to be kept at a standstill over a period of time, but, simultaneously, said activating braking pressure threshold value is not to be set so high that the brake holding state is activated on demand as rapidly as possible without it simultaneously being necessary to force the driver to exert intense pressure for this purpose on the brake pedal.

In particular, in a case of vehicles having automatic transmissions, a suitable selection of the activating braking pressure threshold value is advantageous since this frequently allows a creeping torque that causes the vehicle to continue moving in a direction of travel forward or backward in accordance with a currently selected driving mode. If the direction of travel corresponds by way of example to an uphill direction, the creeping torque namely opposes torque that is caused by a downhill force acting on the vehicle, and consequently supports the braking effect together with a braking torque or brake torque that is generated by the braking pressure, otherwise the braking effect is consequently, additionally reduced and the vehicle could move downhill (at least until the braking pressure is sufficiently high again) if the activating braking pressure threshold value has not been set sufficiently high. Where appropriate, it is also possible in an event of insufficient braking pressure by way of example for undesirable noise to develop and/or vibrations to occur. Moreover, while the vehicle is at a standstill, it is possible for a change of a driving mode into an opposite direction for the creeping torque to subsequently, additionally reduce the braking effect or a change into an idle running mode to at least cancel out previously available support of the braking effect after the brake holding state has already been activated.

In order to take into account unusual driver behavior of this type, it would be necessary to set the activating braking pressure threshold value higher than is actually required for most other drivers.

SUMMARY

The object of the present disclosure is to provide a possibility to automatically adjust a vehicle brake holding system to individual operating circumstances of the vehicle.

The method in accordance with the disclosure renders it possible to adjust an activating braking pressure threshold value of an automatic vehicle brake holding system of a vehicle. A movement state, or a state in which the vehicle is at a standstill, and a braking pressure that is generated by actuation of a vehicle brake are ascertained or monitored. The method comprises activating a brake holding state of the vehicle brake holding system, and starting a procedure to ascertain time if a braking pressure that is generated by actuation of the vehicle brake while the vehicle is at a standstill exceeds an activating braking pressure threshold value of an automatic vehicle brake holding system of the vehicle, ascertaining a movement of the vehicle during an activated brake holding state within a monitoring procedure period of time since starting the procedure to ascertain time, and increasing a value of a number of ascertained movements if a movement occurs within the monitoring procedure period of time. If a value of a number of ascertained movements exceeds a movement threshold value, the activating braking pressure threshold value is increased and the value of the number of ascertained movements is reduced.

The method provides that if the brake holding state is activated, a procedure to ascertain time is (re-)started and movements of the vehicle are monitored if, in other words, each time a braking pressure, which is generated by actuation of the vehicle brake, exceeds the activating braking pressure threshold value while the vehicle is at a standstill, wherein a value of a number of the ascertained movements over cycles of active brake holding states is incremented and, where appropriate, decremented.

The number of movements is ideally zero, however a single movement prior to the braking effect being sufficient (again) can be acceptable if, by way of example, in response to a movement of the vehicle, the braking pressure is automatically increased in order to bring the vehicle (back) to a standstill.

A movement threshold value is an indication of a number that sets a maximum acceptable value for the number of the ascertained movements, and, consequently, an acceptable number of times the vehicle is set in motion before the activating braking pressure threshold value is increased.

A reduction of the value of the number of ascertained movements can in particular include resetting the value to a start value, by way of example zero. In another embodiment, the value is reduced less intensely with a result that a subsequent adjustment of the activating braking pressure threshold value is performed earlier, when appropriate.

The fact that the vehicle is set in motion despite the activated brake holding state means that the braking pressure that is actually locked by the vehicle brake holding system (or a braking pressure that is set in dependence upon the activating braking pressure threshold value) when the activating braking pressure threshold value is exceeded was either already too low to begin with as a result of outside influence, by way of example the driver shifting a vehicle transmission despite a sloping location into an idle running mode, a required braking pressure was increased or during the activated brake holding state was reduced for example owing to a valve overheating or leakage sites in the brake system. Owing to the fact that the activating braking pressure threshold value is increased, with a result that a next time the brake holding state is only activated using a higher braking pressure, the vehicle brake holding system is adjusted to individual operating circumstances of the vehicle independently of whether the individual operating circumstances are influenced by behavior of the driver, a state of the brake system or other outside influences.

In a preferred embodiment, it is provided that if a movement of the vehicle was ascertained, a braking pressure that is triggered by the vehicle brake holding system is increased during the brake holding state. It is therefore provided in this case that the braking pressure is increased directly during a current activated brake holding state in order to immediately or promptly bring the vehicle back to a standstill. Owing to adjustment of the activating braking pressure threshold value, this occurrence is minimized or at least reduced with a result that any associated development of vibrations and/or noises is minimized or at least reduced, if for this purpose by way of example a pump starts up in order to increase the braking pressure.

In an exemplary embodiment, a parking brake of the vehicle is activated if an extent of the movement exceeds a first parking brake threshold value. The first parking brake threshold value is a parking brake activating threshold value above which, depending upon the embodiment of the vehicle brake holding system, the vehicle brake holding system either switches on the parking brake, which can be by way of example an electric parking brake, or completely transfers from the vehicle brake or service brake to the parking brake. The extent that the movement threshold value is exceeded is measured by way of example in a duration of a timespan between starting the procedure for ascertaining time and exceeding the movement threshold value. In a further example, an extent that the movement threshold value is exceeded is measured as a distance, in other words a range, that the vehicle has travelled more than an acceptable distance. In a still further example, a level of a measured velocity or acceleration that the vehicle rolls away is used, for this purpose, to ascertain an extent that the value has been exceeded.

Owing to the adjustment of the activating braking pressure threshold value, the activation of the parking brake is also minimized or at least reduced with a result that any associated development of vibrations and/or noises is also reduced.

In a further exemplary embodiment, a parking brake of the vehicle is activated if a duration of the timespan since starting the procedure that ascertains time exceeds a second parking brake threshold value. This offers an advantage that after a specific uninterrupted period of time of the active brake holding state it is possible to automatically transfer to the parking brake, wherein the second parking brake threshold value is set by way of example in dependence upon a change of braking behavior of the vehicle brake caused by constructive reasons after a specific period of time, for example after multiple, for example 8 minutes, by way of example if valves that are heating up could cause a loss of braking pressure.

In one embodiment, it is provided that if the brake holding state is deactivated, the procedure for ascertaining time is terminated and a value of a number of brake holding state cycles is increased. The procedure to ascertain time is started afresh when the brake holding state is next activated.

In one exemplary embodiment, it is provided that if a value of a number of brake holding state cycles exceeds a first cycle threshold value without the movement threshold value being exceeded, a value of the number of the ascertained movements is reduced, by way of example is reset to a start value. The start value can be by way of example zero. The first cycle threshold value can be for example, 8, 9 or 10 cycles. In this embodiment, it is provided that after a maximum number of cycles a movement counter is decremented or reduced, for example back to zero or to a start value of the movement counter. This offers an advantage that if only very rarely, possibly only in a case of very atypical traffic situations or inclines of the road, the braking pressure during the brake holding state is not sufficient to keep the vehicle at a standstill, the activating braking pressure value that is otherwise possibly, appropriately set can be maintained.

In a further exemplary embodiment, it is provided that if the value of the number of brake holding state cycles exceeds a second cycle threshold value without a movement of the vehicle having been ascertained, a value of the number of the ascertained movements is reduced. A reduction can include by way of example likewise resetting the number to the start value. In another exemplary embodiment, the reduction comprises decrementing or decreasing the value. It can thus be provided by way of example that, after a specific number of cycles of activating and deactivating the brake holding state, which is determined by the second cycle threshold value without the vehicle having been set in motion, the value of the number of the ascertained movements is reduced. By way of example, it can be provided to select the second cycle threshold value lower than for example half as high as the first cycle threshold value.

In one embodiment, the value of the number of ascertained movements is increased by an amount that is dependent upon the procedure to ascertain time. Whilst otherwise, by way of example the value is always increased by the same amount, by way of example 1, it is provided that in this embodiment, the amount is weighted by way of example in that the value is increased by a small amount if movement only occurs late, and the value is increased by a higher amount if movement occurs early after starting the procedure to ascertain time.

In one exemplary embodiment in which the procedure to ascertain a movement of the vehicle during the activated brake holding state since starting the procedure to ascertain time is also performed outside a monitoring procedure period of time, it is in particular provided that an amount by which the value of the number of the ascertained movements is increased changes, if movement occurs outside the monitoring procedure period of time. In this manner, a movement of the vehicle within the monitoring procedure period of time is weighted heavier than if the movement only occurs later.

In one embodiment, the activating braking pressure threshold value is increased by a braking pressure amount that is dependent upon an angle of inclination of the vehicle. This has an advantage that the activating braking pressure threshold value is adjusted to an environment in which the vehicle that has the vehicle brake holding system is being used. Steep slopes require a higher braking pressure that the system approaches quicker if the activating braking pressure threshold value is more intensely increased, whereas non-inclined or slightly inclined roads also require only a small increase of the braking pressure, and an increase that is too intense would unnecessarily, greatly reduce a sensitivity of the system.

In one embodiment, the braking pressure amount that the activating braking pressure threshold value is increased is calculated in dependence upon the angle of inclination of the vehicle and a timespan that is past within the monitoring procedure period of time since starting the procedure to ascertain time to a point in time at which the movement threshold value is exceeded. By way of example, if an earlier the movement threshold value is exceeded, the greater the increase in the activating braking pressure threshold value.

In an exemplary embodiment, it is provided that the activating braking pressure threshold value is only increased if the angle of inclination exceeds an angle of inclination threshold value. In this manner it is possible to prevent the system performing an adjustment of the activating braking pressure threshold value too frequently with a result that the driver can be more aware of which inclines of the road will lead to an adjustment of the behavior of the vehicle brake holding system, and which inclines do not. Moreover, drivers can thus profit from optimized support by the vehicle brake holding system, said drivers only experiencing difficulties with the system if the vehicle comes to a standstill on an accordingly, greatly inclined road, whereas in the case of inclines below the angle of inclination threshold value the activating braking pressure threshold value can remain low and sensitivity of the system can consequently remain high.

In one embodiment, the monitoring procedure period of time includes a respective entire period of time between activating and deactivating the brake holding state, in other embodiments a part region of said time period. In one embodiment, the monitoring procedure period of time is two minutes long. However, said monitoring procedure period of time can also be shorter or longer. The monitoring procedure period of time is determined by a duration of a timespan for which the vehicle brake holding system should be at least capable of maintaining the activated brake holding state for the vehicle. This value can be determined by way of example by an environment in which the vehicle is operated. If the activated brake holding state can be maintained for at least 2 minutes, optimization of the activating braking pressure threshold value is therefore performed for a period of time that includes a particularly large proportion of driving situations that the vehicle brake holding system is used, by way of example in traffic jam situations or in case of waiting times at traffic lights or similar, for example in a case of inclined road.

Furthermore, the subject matter of a further independent claim relates to a vehicle having a vehicle brake holding system that comprises at least one movement ascertaining device that is configured so as to ascertain a movement of the vehicle or that the vehicle is at a standstill, a vehicle brake and an automatic vehicle brake holding system that is configured so as to activate a brake holding state if a braking pressure that is generated through actuation of the vehicle brake exceeds an activating braking pressure threshold value of the automatic vehicle brake holding system while the vehicle is at a standstill, wherein the vehicle brake holding system moreover comprises a device to ascertain time and a movement state counting device. as the device is also configured to start a procedure to ascertain time if a brake holding state is activated and to ascertain a movement of the vehicle during the activated brake holding state within a monitoring procedure period of time since starting the procedure to ascertain time using the movement state counting device. The device is also configured to increase a value of a number of ascertained movements if a movement of the vehicle occurs within the monitoring procedure period of time, increase the activating braking pressure threshold value and reduce a value of a number of ascertained movements if the value of the number of the ascertained movements exceeds a movement threshold value. In accordance with the disclosure, the vehicle having the vehicle brake holding system is configured so as to implement the method in accordance with any one of the above-described embodiments. In this manner, advantages and characteristics of the method in accordance with the disclosure to adjust an activating braking pressure threshold value of an automatic vehicle brake holding system of a vehicle are also implemented within the scope of a vehicle having a vehicle brake holding system.

The device to ascertain time, and the movement state counting device are by way of example connected to or are an integral component of a control unit of the vehicle brake holding system.

In one embodiment, it is provided that the device to ascertain time comprises a counter. It is thus possible by regularly triggering the counter to ascertain in a simple manner a duration of a timespan since activating the brake holding state, and establish reaching an end of a monitoring procedure period of time by a simple comparison with a counter reading that corresponds to a length of the monitoring procedure period of time.

In one embodiment, the movement state counting device comprises a further counter. The further counter or movement counter ascertains in a simple manner how often the vehicle is set in motion again despite an active brake holding state. The movement state of the vehicle is ascertained using the movement ascertaining device, which can be a device that is connected to the vehicle brake holding system or a part of the vehicle brake holding system. The movement state counting device of the vehicle brake holding system can either be a part of the movement ascertaining device or connected to said movement ascertaining device, and receives by way of example each time a countable pulse, if the vehicle is set back in motion despite the active brake holding state.

In one embodiment, the vehicle brake holding system comprises a storage device to store a counter reading at least of the further counter. The reading of the further counter is reduced, by way of example reset, to a start value of the further counter if the movement threshold value has been exceeded and the activating braking pressure threshold value has been adjusted. It can be provided in this embodiment to store the counter reading in the storage device, said storage device storing the counter value also over multiple cycles of activation and deactivation of the brake holding state. By way of example, it can be provided that the storage device is a non-volatile storage device that also stores the counter reading if the vehicle brake holding system or the vehicle are not in operation. In this manner, it is also possible to ascertain movements of the vehicle in the activated brake holding state over a plurality of driving cycles.

In one preferred embodiment, the vehicle comprises an automatic transmission. In particular, a creeping torque of the automatic transmission can make it necessary to readjust the activating braking pressure threshold value if the driver selects a switching position, selects an "idle running" mode or a driving mode that is counter to an incline with a result that the creeping torque does not generate an additional braking effect, and, where appropriate, a braking effect is reduced. If as a consequence the vehicle is set in motion multiple times during each active brake holding state of the vehicle brake holding system, the activating braking pressure threshold value is automatically adjusted, and the system adapts to individual operating circumstances of the vehicle, said circumstances being influenced in this case by the driver.

Further advantages of the present disclosure are evident in the detailed description and the figures. The disclosure is explained below in conjunction with the following description of exemplary embodiments with reference to the accompanying illustrations. In the drawing:

DETAILED DESCRIPTION

Figure 1:
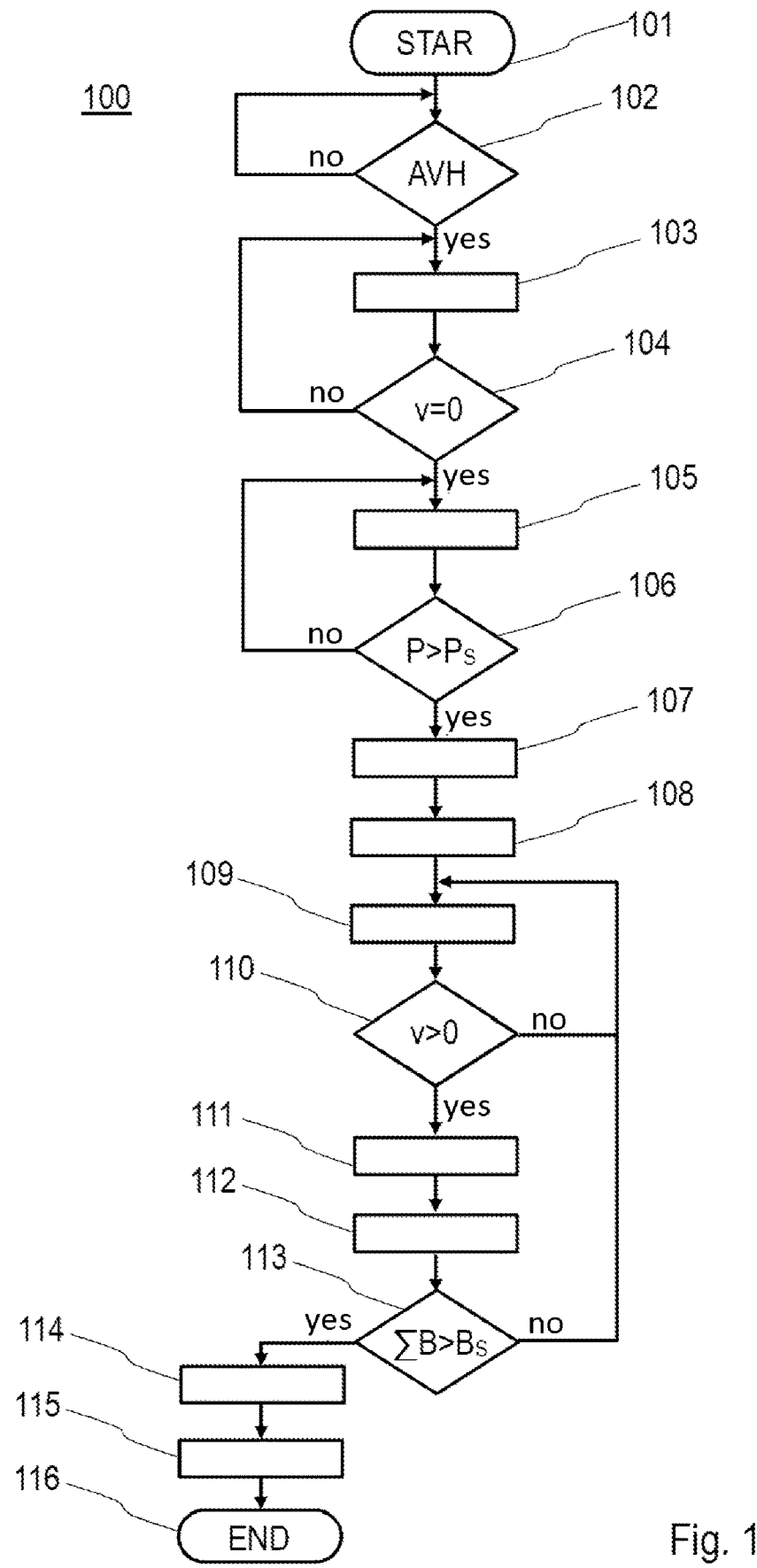
FIG. 1 illustrates, schematically a method to adjust an activating braking pressure threshold value of an automatic vehicle brake holding system of a vehicle in accordance with one embodiment of the disclosure.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In the figures, identical or similar elements are provided with identical reference numerals provided this is expedient.

FIG. 1 illustrates, schematically an example of a method 100 to adjust an activating braking pressure threshold value of an automatic vehicle brake holding system of a vehicle in accordance with one embodiment of the disclosure. After a start 101 of the method, an initial check 102 is performed to establish whether the vehicle brake holding system of the vehicle is in operation ("AVH on"). This is in particular expedient if a driver of the vehicle can bring the system into operation and out of operation by way of example via a switch. If the vehicle brake holding system is not in operation, the method either terminates or waits for the vehicle brake holding system to be brought into operation. If the vehicle brake holding system is in operation, vehicle movement is monitored 103 using a suitable sensor. The procedure to ascertain the vehicle movement includes at least one check 104 to establish whether the vehicle is currently in a state of being at a standstill (v=0) or is in motion. If the vehicle is in motion, the procedure to monitor movement is continued.

If the vehicle is at a standstill (v=0), initially a current braking pressure is ascertained 105 using a suitable sensor, and a check 106 is performed to establish whether the current braking pressure (P) exceeds the activating braking pressure threshold value ($P_S$) of the vehicle brake holding system. If this is not the case, the current braking pressure is further monitored in order to be able to promptly identify if the activating braking pressure threshold value has been exceeded at a later point.

If the current braking pressure exceeds the activating braking pressure threshold value, a brake holding state of the vehicle brake holding system is activated 107 in which the current braking pressure is locked and is maintained independently by the vehicle brake holding system. Moreover, a procedure to ascertain time is started 108. A movement state is monitored, in other words a movement of the vehicle is ascertained 109, during the activated brake holding state and a check 110 is performed to establish whether the vehicle is moving or not. If no movement is detected, the movement state is further monitored.

Otherwise, if within the monitoring procedure period of time, a movement occurs, it is provided in the illustrated exemplary embodiment to increase 111 the braking pressure and a movement state counter is incremented in order to implement an increase 112 of a value of a number of ascertained movements (B). A check 113 is performed to establish whether the value of the number of ascertained movements (B) of the vehicle exceeds a movement threshold value ($B_S$). If this is not the case, the monitoring procedure of the movement state of the vehicle is continued.

If the check 113 indicates whether the number of movements of the vehicle within the monitoring procedure period of time exceeds the movement threshold value but that the movement threshold value has been exceeded, the activating braking pressure threshold value is increased 114 and the value of the number of the ascertained movements is reduced 115. By way of example, it can be provided that an increase is always performed by a fixed amount or that an amount is dependent upon an angle of inclination of the vehicle, or the value is only increased if the angle of inclination exceeds a minimum value that can be configured by way of example by the driver.

In the illustrated exemplary embodiment, the method is terminated 116, wherein a movement counter reading is stored with a result that a current value of the number of ascertained movements is available, as soon as the active brake holding state is terminated, the active brake holding state is re-activated. A state of the movement state counter is therefore stored if the brake holding state is deactivated and/or if the vehicle brake holding system is taken out of operation, and is available in case the vehicle brake holding system is brought back into operation, or the brake holding state is re-activated with the result that the number of movements of the vehicle is accumulated during the active brake holding state.

Figure 2:
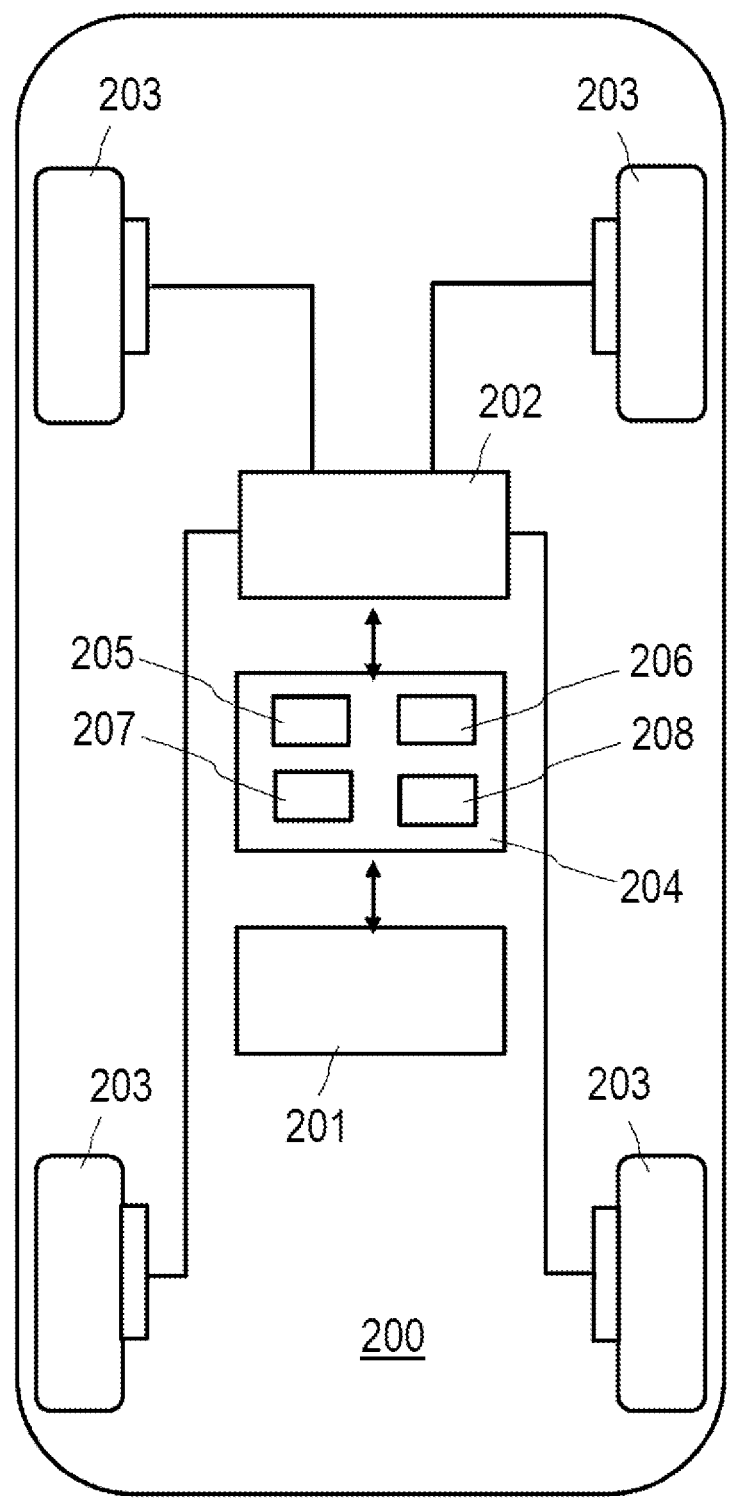
FIG. 2 illustrates, schematically an example of a vehicle having a vehicle brake holding system in accordance with a further embodiment of the disclosure.

FIG. 2 illustrates schematically an example of a vehicle having a vehicle brake holding system in accordance with a further embodiment of the disclosure. The vehicle 200 comprises at least one movement ascertaining device 201 that ascertains a movement of the vehicle 200, and a vehicle brake 202, illustrated in this case in an exemplary manner as a vehicle brake system that is connected to all four wheels 203 of the vehicle 200 and can act in this manner.

Moreover, the vehicle comprises an automatic vehicle brake holding system 204 that is connected to the vehicle brake 202, and that activates a brake holding state if a braking pressure is generated through actuation of the vehicle brake 202 exceeds an activating braking pressure threshold value of the automatic vehicle brake holding system 204 while the vehicle 200 is at a standstill. For this purpose, the vehicle brake holding system 204 comprises a control unit (not illustrated) and also a braking pressure sensor (not illustrated). Alternatively, the current braking pressure is ascertained by the vehicle brake system, in other words the vehicle brake 202 and is transmitted to the vehicle brake holding system. Although the vehicle brake 202 and the vehicle brake holding system 204 are illustrated as separate but mutually connected devices, it is possible for their functionalities to also be implemented in another exemplary embodiment in a common device.

Moreover, the vehicle brake holding system 204 comprises a device to ascertain time 205 and a movement state counting device 206, and is configured so as to start a procedure to ascertain time via the device 205 if the brake holding state is activated, so as to ascertain a movement of the vehicle 200 during the activated brake holding state within a monitoring procedure period of time since starting a procedure to ascertain time using the movement state counting device 206, and so as to increase a value of a number of ascertained movements if a movement of the vehicle 200 occurs within the monitoring procedure period of time. If the value of the number of ascertained movements exceeds a movement threshold value, the activating braking pressure threshold value is increased and the value of the number of ascertained movements is reduced, preferably reset to a start value.

Moreover, in the illustrated exemplary embodiment, the vehicle brake holding system 204 comprises a non-volatile storage device 207 to store at least a reading of the movement state counting device after deactivating the brake holding state. Moreover, in the illustrated embodiment, it is provided that the vehicle brake holding system 204 comprises an incline sensor 208 with which it is possible to ascertain an incline of the vehicle. Reference is to be made to the fact that the elements that are illustrated as an integral component of the vehicle brake holding system 204 are not part of the vehicle brake holding system in other embodiments, but rather are connected to said system or can be connected to said system.

The Figures are not necessarily accurate in every detail and true to scale and by way of example can be enlarged or reduced in size in order to offer a better view. Disclosed functional details are therefore not to be understood as limiting, but rather to be understood only as a visual basis that offers instruction to the person skilled in the art in this field of technology in order to use the present disclosure in varied ways.

It is understood that method steps although described in accordance with a specifically ordered sequence, in part could be implemented in sequences other than that described here. Furthermore, it is understood that specific steps could be implemented simultaneously, that other steps could be added or that specific steps described here could be omitted. In other words: the present descriptions are provided to illustrate specific embodiments and should not be seen as limiting disclosed subject matter.

The expression "and/or" that is used in this case if it is used in a series of two or more elements means that each of the elements that are provided can be used alone or that any combination of two or more of the elements that are provided can be used. If by way of example a combination is described that includes the components A, B and/or C the combination can include A alone; B alone; C alone; A and B in combination; A and C in combination; B and C in combination; or A, B and C in combination.

Although the disclosure has been illustrated in detail and described by means of the exemplary embodiments, the disclosure is not limited by the disclosed examples and other variations can be derived therefrom by the person skilled in the art without departing the protective scope of the disclosure.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method to adjust an activating braking pressure threshold value of an automatic vehicle brake holding system comprising:
   activating a brake holding state of the vehicle brake holding system to initiate a counter to ascertain time in response to a braking pressure that is generated through actuation of a vehicle brake while a vehicle is at a standstill and exceeding a threshold value;
   ascertaining a movement during the brake holding state within a monitoring procedure period of time since the initiation of the counter;
   increasing a movement value of a number of ascertained movements in response to a movement occurring within the monitoring procedure period of time; and
   increasing the threshold value to reduce the threshold value in response to the movement value exceeding a movement threshold value.

2. The method as claimed in claim 1 further comprising increasing the braking pressure during the brake holding state responsive to the movement.

3. The method as claimed in claim 2 further comprising activating a parking brake in response to an extent of the movement exceeding a first parking brake threshold value.

4. The method as claimed in claim 2 further comprising activating a parking brake in response to a duration of a timespan since the initiation of the counter exceeding a second parking brake threshold value.

5. The method as claimed in claim 1 further comprising terminating the counter and increasing a brake holding state value of a number of brake holding state cycles in response to the brake holding state being deactivated.

6. The method as claimed in claim 5 further comprising reducing the movement value in response to the brake holding state value exceeding a first cycle threshold value without exceeding the movement threshold value.

7. The method as claimed in claim 5 further comprising reducing the movement value in response to the brake holding state value exceeding a second cycle threshold value without the movement.

8. The method as claimed in claim 1 further comprising increasing the movement value by an amount dependent upon the counter.

9. The method as claimed in claim 8 further comprising changing an amount of the movement value in response to the movement occurring outside the monitoring procedure period of time.

10. The method as claimed in claim 1 further comprising increasing the threshold value by a braking pressure amount based on an angle of inclination of the vehicle.

11. The method as claimed in claim 10 further comprising determining a braking pressure amount by which the threshold value is increased based upon the angle of inclination and a timespan that has passed since initiating the counter until the movement threshold value is exceeded.

12. The method as claimed in claim 10 further comprising increasing the threshold value in response to the angle of inclination exceeding an angle of inclination threshold value.

13. The method as claimed in claim 1, wherein the monitoring procedure period of time is two minutes.

14. The vehicle of claim 1, wherein the brake system is further configured to, responsive to movement of the vehicle during the time period, increase the pressure.

15. A vehicle comprising:
a sensor configured to detect a vehicle movement;
a brake holding system configured to activate a holding state in response to a braking pressure exceeding a threshold value while the movement is a standstill, wherein the holding state is activated with or without brake pedal actuation; and
a time device configured start a timer once the holding state is activated, wherein the brake holding system is configured to increase the pressure threshold in response to the sensor detecting a number of movements of the vehicle during the holding state within a monitoring time period since timer start.

16. The vehicle as claimed in claim 15, wherein the time device includes a counter.

17. The vehicle as claimed in claim 15, wherein the sensor includes a second counter.

18. The vehicle as claimed in claim 17, wherein the brake holding system includes a storage device configured at least to store a reading of the second counter.

19. The vehicle as claimed in claim 15 further comprising an automatic transmission.

20. A vehicle comprising:
a brake system configured to,
responsive to a pressure of the brake system exceeding a pressure threshold during vehicle standstill, activate a brake holding state for the brake system to maintain vehicle stand still regardless of brake pedal actuation, and
responsive to indication of a number of movements of the vehicle during a time period initiated with the brake holding state exceeding a number threshold, increase the pressure threshold.

* * * * *